US012555374B2

(12) United States Patent
Simonelli et al.

(10) Patent No.: US 12,555,374 B2
(45) Date of Patent: Feb. 17, 2026

(54) IMAGE ANALYSIS SYSTEMS AND METHODS FOR WILDFIRE RISK ASSESSMENT

(71) Applicant: Betterview Marketplace, Inc., San Francisco, CA (US)

(72) Inventors: Julius Simonelli, San Diego, CA (US); Ilsoo Seong, Aliso Viejo, CA (US)

(73) Assignee: NEARMAP US, INC., Lehi, UT (US)

( * ) Notice: Subject to any disclaimer, the term of this patent is extended or adjusted under 35 U.S.C. 154(b) by 364 days.

(21) Appl. No.: 18/239,483

(22) Filed: Aug. 29, 2023

(65) Prior Publication Data

US 2025/0078499 A1    Mar. 6, 2025

(51) Int. Cl.
| | | |
|---|---|---|
| *G06V 20/10* | (2022.01) | |
| *A62C 3/02* | (2006.01) | |
| *G01S 17/86* | (2020.01) | |
| *G01S 17/89* | (2020.01) | |
| *G06V 10/24* | (2022.01) | |

(52) U.S. Cl.
CPC .......... *G06V 20/188* (2022.01); *A62C 3/0271* (2013.01); *G01S 17/86* (2020.01); *G01S 17/89* (2013.01); *G06V 10/24* (2022.01); *G06V 20/176* (2022.01)

(58) Field of Classification Search
None
See application file for complete search history.

(56) References Cited

U.S. PATENT DOCUMENTS

| | | |
|---|---|---|
| 9,152,863 B1 | 10/2015 | Grant |
| 10,529,029 B2 | 1/2020 | Okazaki |
| 10,572,948 B1 | 2/2020 | Cook et al. |
| 10,650,285 B1 | 5/2020 | Okazaki |
| 10,949,930 B1 | 3/2021 | Tofte et al. |

(Continued)

OTHER PUBLICATIONS

Wang, Fan, "Understanding High Resolution Aerial Imagery Using Computer Vision Techniques." Chester F. Carloson Center for Imaging Science College of Science. Aug. 2017. https://home.cis.rit.edu/~cnspci/references/theses/phd/wang2017.pdf.

*Primary Examiner* — Lennin R Rodriguezgonzalez
(74) *Attorney, Agent, or Firm* — Ruggiero McAllister & McMahon LLC

(57) ABSTRACT

Methods, non-transitory computer-readable media, and property analysis systems are disclosed that extract vegetation location information from overhead and LIDAR images associated with a geographic location. The images are aligned based on the extracted vegetation information. Models are applied to the aligned images based on vegetation height information extracted from the LIDAR images. A graph is then generated based on a result of the application of the models. The graph represents a relationship between vegetation, one or more buildings, and one or more fire pathways associated with the geographic location. A wildfire risk score generated based on the graph is then output for the buildings via a GUI. Thus, the disclosed technology applies wildfire spread models and graphs to vegetation and buildings identified in aligned overhead and LIDAR imagery to provide relatively accurate wildfire risk assessment to insurers and homeowners and thereby facilitate informed decision-making and preventative measures.

20 Claims, 7 Drawing Sheets

(56) References Cited

U.S. PATENT DOCUMENTS

| | | |
|---|---|---|
| 11,030,491 B2 | 6/2021 | Okazaki |
| 11,151,378 B2 | 10/2021 | Kottenstette et al. |
| 11,195,058 B2 | 12/2021 | Okazaki |
| 11,347,976 B2 | 5/2022 | Okazaki |
| 11,551,040 B2 | 1/2023 | Okazaki |
| 11,687,768 B2 | 6/2023 | Okazaki |
| 2019/0205287 A1* | 7/2019 | Emison ................ G06Q 10/083 |

* cited by examiner

IMAGE ANALYSIS SYSTEMS AND METHODS FOR WILDFIRE RISK ASSESSMENT

FIELD

The disclosed technology generally relates to image analysis systems and methods for assessing wildfire risk and, more particularly, to systems and methods that leverage overhead and light detection and ranging (LIDAR) imagery to analyze a property's wildfire risk with increased reliability and accuracy.

BACKGROUND

Wildfire risk can be assessed to facilitate informed decisions and mitigate the risk to buildings and property. For insurers, accurate wildfire risk assessment is essential to calculate premiums and replacement costs and plan for potential claims. Current fire behavior prediction (FBP) systems use mathematical models to predict the spread, intensity, and behavior of wildfires based on factors like weather, fuel type, and topography. Examples of FBP systems include the Canadian Forest FBP System and the U.S.-based BehavePlus. Other current systems include fire danger rating systems (FDRSs), which estimate the potential fire danger based on factors like weather, fuel moisture, and fire history. Examples of FDRSs include the National FDRS in the U.S. and the Australian FDRS.

Other current tools used to assess wildfire risk include remote sensing and geographic information system (GIS) technologies in which satellite imagery and aerial photography are used to map fuel types, vegetation, and other features that contribute to wildfire risk. GIS tools allow for the integration and analysis of this spatial data with other information like weather data and topography. With the increasing frequency and severity of wildfires in recent years, there is a growing importance of detailed and accurate risk assessments to inform preparedness and mitigation efforts. However, despite its importance, current methods for assessing wildfire risk, which use various tools and models to predict fire behavior and potential impact, lack accuracy and reliability.

Specifically, conventional systems lack granularity, focus on large-scale analysis, and do not provide building-specific assessments, making it difficult for individual homeowners or their insurers to understand their specific wildfire risks. Current systems also exhibit an insensitivity to small-scale changes and are not designed to capture or consider the impact of such changes, including the growth or removal of a single tree, on the wildfire risk for a specific building. Many existing wildfire risk models also have limited accuracy in predicting fire behavior, especially under complex environments, which can lead to incorrect risk assessments and resource allocation.

Moreover, existing wildfire risk assessment systems are unable to account for ember transport and spotting, which are significant causes of wildfire spreading. Conventional wildfire risk assessments also rely on limited or outdated data sets, which can affect the accuracy and relevance of their predictions. Wildfire risk assessment systems also generally lack the capability to analyze high-resolution imagery and process large volumes of data, restricting the ability of these systems to provide granular and sophistical wildfire assessment scoring. Thus, current wildfire risk assessment technologies are unable to assess risk at a sufficiently granular level and have limited predictive accuracy and reliability.

SUMMARY

Described herein are image analysis systems and methods for wildfire risk assessment that leverage a granular and scalable approach to predict and inform regarding property vulnerability to wildfires with increased reliability, accuracy, and precision. The disclosed technology advantageously assesses and scores wildfire risk for buildings based on overhead and light detection and ranging (LIDAR) images, models generated to estimate fire behavior and risk based on vegetation characteristics, including height and position, and graphs that use the model outputs to represent and analyze the relationship between vegetation, buildings, and fire pathways for a geographic location.

In one embodiment, the present disclosure is directed to a method that is implemented by a property analysis system and includes extracting vegetation location information from at least one overhead image and at least one LIDAR image associated with a geographic location in response to a wildfire risk request comprising the geographic location received from a user device. The overhead and LIDAR images are aligned based on the extracted vegetation information. One or more models are then applied to the aligned overhead and LIDAR images based at least in part on vegetation height information extracted from the LIDAR image. A graph is then generated based on a result of the application of the models. The graph represents a relationship between vegetation, one or more buildings, and one or more fire pathways associated with the geographic location. A wildfire risk score is output for at least one of the buildings via a graphical user interface (GUI) provided to the user device in response to the wildfire risk request. The estimated wildfire risk is generated based on the generated graph.

In some examples, the models comprise an ember transport model and the method further comprises applying the ember transport model based on one or more of wind speed or relative positions of the vegetation determined from the vegetation location information to generate an indication of ember behavior during a wildfire. In other examples, the models comprise a direct fire spread model and the method further comprises applying the direct fire spread model to generate a likelihood of fire spread through contact between one or more of the vegetation and the buildings or between clusters of the vegetation. In these examples, the direct fire spread model is applied further based on one or more of the relative positions of the vegetation or other relative positions of the vegetation and the buildings.

In yet other examples, one or more mitigation actions to reduce wildfire risk for the geographic location are determined. A graphical representation of the geographic location comprising an indication of one or more potential hazards associated with the geographic location, or a relative wildfire risk associated with one or more regions of the geographic location, is generated. The GUI includes the graphical representation and the mitigation actions in these examples.

In further examples, a computer vision model is applied to data obtained for the overhead image to determine a location of the vegetation within the geographic location. The data for the overhead image is obtained via one or more networks from an overhead image server. Another location of the vegetation can be determined from other data for the LIDAR image obtained via the networks from a LIDAR server in these examples. The LIDAR data can then be combined with the imagery data to facilitate the alignment. In these examples, a selection is made from the vegetation based on an overlap of the vegetation location information from the overhead image and the LIDAR image. The models are then applied to the aligned overhead and LIDAR images based at least in part on the vegetation height information extracted from the LIDAR image for the selected vegetation.

In other embodiments, a property analysis system is disclosed that includes memory having instructions stored thereon and one or more processors coupled to the memory and configured to execute the stored instructions to extract vegetation location information from at least one overhead image and at least one LIDAR image associated with a geographic location in response to a wildfire risk request comprising the geographic location received from a user device. The overhead and LIDAR images are aligned based on the extracted vegetation information. One or more of an ember transport model or a direct fire spread model is applied to the aligned overhead and LIDAR images based at least in part on a vegetation height information extracted from the LIDAR image. A graph is then generated based on a result of the application of the ember transport model or the direct fire spread model. The graph represents a relationship between vegetation, one or more buildings, and one or more fire pathways associated with the geographic location. A wildfire risk score is output for at least one of the buildings via a GUI provided to the user device in response to the wildfire risk request. The estimated wildfire risk is generated based on the generated graph.

In some examples, the processors are further configured to execute the stored instructions to apply the ember transport model further based on one or more of wind speed or relative positions of the vegetation determined from the vegetation location information to generate an indication of ember behavior during a wildfire. In other examples, the processors are further configured to execute the stored instructions to apply the direct fire spread model further based on relative positions of the vegetation or other relative positions of the vegetation and the buildings to generate a likelihood of fire spread through contact between one or more of the vegetation and the buildings or between clusters of the vegetation.

In other examples, the processors are further configured to execute the stored instructions to determine one or more mitigation actions to reduce a wildfire risk for the geographic location. A graphical representation of the geographic location is generated that comprises an indication of one or more potential hazards associated with the geographic location or a relative wildfire risk associated with one or more regions of the geographic location. The GUI is output to include the graphical representation and the mitigation actions.

In yet other examples, the processors are further configured to execute the stored instructions to apply a computer vision model to data obtained for the overhead image to determine a location of the vegetation within the geographic location. The data for the overhead image is obtained via one or more networks from an overhead image server. Another location of the vegetation is determined from other data for the LIDAR image obtained via the networks from a LIDAR server. The data and the other data are then combined to facilitate the alignment. In additional examples, the processors are further configured to execute the stored instructions to select from the vegetation based on an overlap of the vegetation location information from the overhead image and the LIDAR image. The models are then applied to the aligned overhead and LIDAR images based at least in part on the vegetation height information extracted from the LIDAR image for the selected vegetation.

In yet another embodiment, a non-transitory computer-readable medium is disclosed that has stored thereon instructions comprising executable code that, when executed by one or more processors, causes the processors to extract vegetation location information from at least one overhead image and at least one LIDAR image for vegetation associated with a geographic location in response to a wildfire risk request comprising the geographic location received from a user device. A selection is made from the vegetation based on an alignment of the overhead and LIDAR images according to the extracted vegetation information. One or more models are applied to the aligned overhead and LIDAR images based at least in part on a vegetation height information extracted from the LIDAR image for the selected vegetation. A graph is generated based on a result of the application of the models. The graph represents a relationship between the selected vegetation, one or more buildings associated with the geographic location, and one or more fire pathways associated with the geographic location. A wildfire risk score is output for at least one of the buildings via a graphical user interface (GUI) provided to the user device in response to the wildfire risk request. The wildfire risk score is generated based on the generated graph.

In some examples, the models comprise an ember transport model and the executable code, when executed by the processors, further causes the processors to apply the ember transport model to generate an indication of ember behavior during a wildfire. In these examples, the executable code, when executed by the processors, further causes the processors to apply the ember transport model based on one or more of wind speed or relative positions of the selected vegetation determined from the vegetation location information. In other examples, the models comprise a direct fire spread model and the executable code, when executed by the processors, further causes the processors to apply the direct fire spread model to generate a likelihood of fire spread through contact between one or more of the selected vegetation and the buildings or between clusters of the selected vegetation. In these examples, the executable code, when executed by the processors, further causes the processors to apply the direct fire spread model based on one or more of the relative positions of the selected vegetation or other relative positions of the selected vegetation and the buildings.

In yet other examples, the executable code, when executed by the processors, further causes the processors to determine one or more mitigation actions to reduce a wildfire risk for the geographic location. A graphical representation of the geographic location is generated comprising an indication of one or more potential hazards associated with the geographic location or a relative wildfire risk associated with one or more regions of the geographic location. The GUI is then output to include the graphical representation and the mitigation actions.

In further examples, the executable code, when executed by the processors, further causes the processors to apply a computer vision model to data obtained for the overhead image to determine a location of the vegetation within the geographic location. The data for the overhead image is obtained via one or more networks from an overhead image server. In additional examples, another location of the vegetation is determined from other data for the LIDAR image obtained via the networks from a LIDAR server. The data and the other data are combined to facilitate the alignment.

The models are then applied in these examples to the aligned overhead and LIDAR images based at least in part on the vegetation height information extracted from the LIDAR image for the selected vegetation.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. In the drawings.

DETAILED DESCRIPTION

This disclosure is not limited to the particular systems, devices and methods described, as these may vary. The terminology used in the description is for the purpose of describing the particular versions or embodiments only and is not intended to limit the scope.

Figure 1:
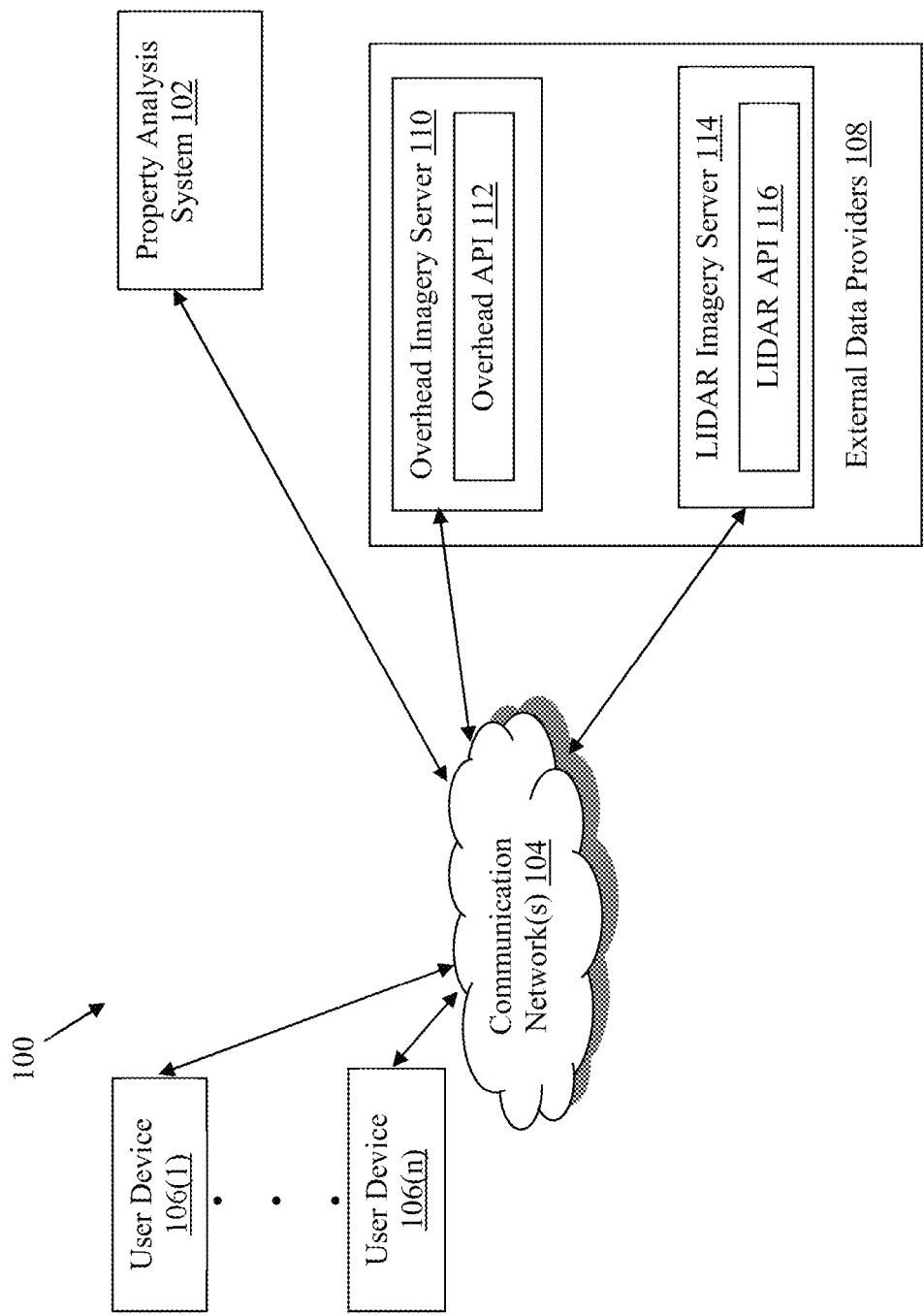
FIG. 1 is a block diagram of an exemplary network environment with a property analysis system.

Referring to FIG. 1, an exemplary network environment 100 is illustrated that includes a property analysis system 102, which is coupled via communication network(s) 104 to user devices 106(1)-106(n) and external data providers 108, which in this example include an overhead imagery server 110 hosting an overhead API 112 and a light detection and ranging (LIDAR) server 114 hosting a LIDAR API 116, although other external data providers can also be included in the network environment in other examples. The network environment 100 may include other network devices such as one or more routers or switches, for example, which are known in the art and thus will not be described herein.

In this example, the property analysis system 102, user devices 106(1)-106(n), overhead imagery server 110, and LIDAR server 114, are disclosed in FIG. 1 as dedicated hardware devices. However, one or more of the property analysis system 102, user devices 106(1)-106(n), overhead imagery server 110, or LIDAR server 114 can also be implemented in software within one or more other devices in the network environment 100. As one example, the property analysis system 102, as well as any of its components or applications, can be implemented as software executing on one of the external data providers 108, and many other permutations and types of implementations and network topologies can also be used in other examples.

Figure 2:
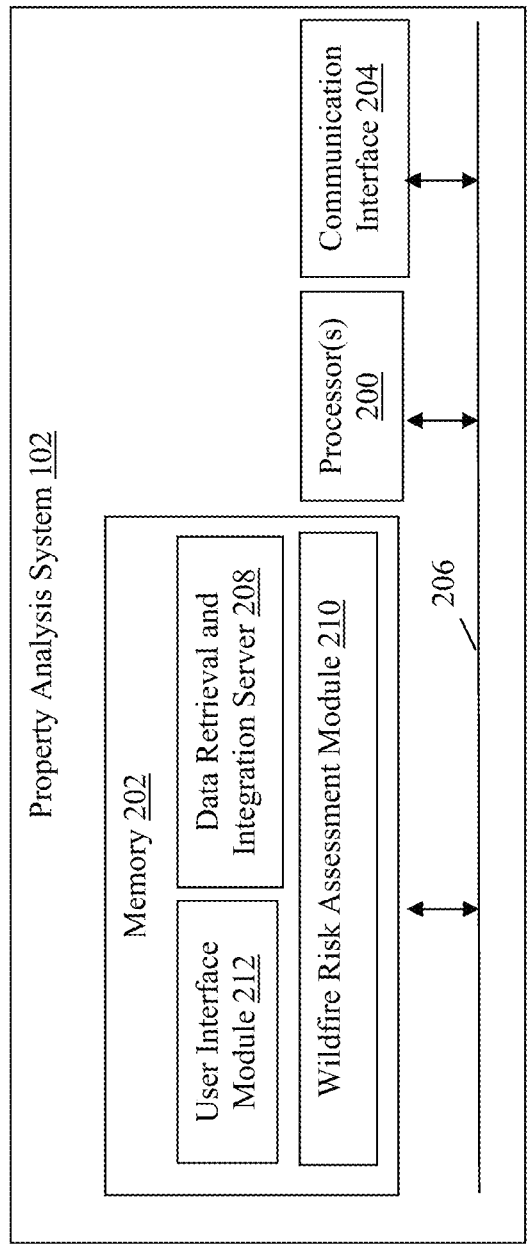
FIG. 2 is a block diagram of an exemplary property analysis system.

Referring to FIGS. 1-2, the property analysis system 102 may perform any number of functions, including image analysis, image preprocessing, applying machine learning, computer vision, and other models, and providing graphical user interfaces (GUIs) to the user devices 106(1)-106(n), among other functions as described in detail below. The property analysis system 102 in this example includes processor(s) 200, memory 202, and a communication interface 204, which are coupled together by a bus 206, although the property analysis system 102 can include other types or numbers of elements in other configurations.

The processor(s) 200 of the property analysis system 102 may execute programmed instructions stored in the memory 202 of the property analysis system 102 for any number of the functions described herein. The processor(s) 200 may include one or more processing cores, one or more central processing units, and/or one or more graphics processing units, for example, although other types of processor(s) can also be used.

The memory 202 stores these programmed instructions for one or more aspects of the present technology as described herein, although some or all of the programmed instructions could be stored elsewhere. A variety of different types of memory storage devices, such as random-access memory (RAM), read-only memory (ROM), hard disk, solid state drives, flash memory, or other computer-readable medium which is read from and written to by a magnetic, optical, or other reading and writing system that is coupled to the processor(s) 200, can be used for the memory 202.

Accordingly, the memory 202 can store applications that can include computer-executable instructions that, when executed by the processor(s) 200, cause the property analysis system 102 to perform actions, such as to transmit, receive, or otherwise process network messages and requests and generate graphical interfaces and displays, for example, and to perform other actions described herein. The application(s) can be implemented as components of other applications, operating system extensions, and/or plugins, for example.

Further, the application(s) may be operative in a cloud-based computing environment with access provided via a software-as-a-service (SaaS) model. The application(s) can be executed within or as virtual machine(s) or virtual server(s) that may be managed in a cloud-based computing environment. Also, the application(s), and even the property analysis system 102 itself, may be located in virtual server(s) running in a cloud-based computing environment rather than being tied to specific physical network computing devices.

In some examples, the memory 202 includes a data retrieval and integration server 208, a wildfire risk assessment module 210, and a user interface module 212, although other modules can also be used in other examples. The data retrieval and integration server 208 is configured to obtain overhead imagery data, including overhead images, from the overhead imagery server 110 via the overhead API 112 and LIDAR imagery data, including LIDAR images, from the LIDAR imagery server 114 via the LIDAR API 116.

The wildfire risk assessment module 210 generally obtains the overhead and LIDAR imagery data and analyzes the imagery data to generate a wildfire risk score for buildings identified in the obtained images. In some examples, the wildfire risk assessment module 210 identifies vegetation in the overhead and LIDAR images and aligns those images based on the identified vegetation. With the aligned images, the wildfire risk assessment module 210 applies models, such as ember transport and direct fire spread models, for example, to generate a graph representing a relationship between vegetation, buildings, and fire pathways associated with a geographic location. The wildfire risk assessment module 210 then scores one or more of the buildings at the geographic location based on an analysis of the graph. The operation of the wildfire risk assessment module 210 will be described in more detail below with reference to FIGS. 3-4.

The user interface module 212 is configured to both obtain from the user devices 106(1)-106(n) the input geographical information (e.g., an address or geographic coordinates) as well as generate interactive GUIs that include the wildfire risk assessment scoring for buildings generated by the wildfire risk assessment module 210 along with the overhead images that reflect the wildfire risk assessment scoring and other contextual information (e.g., suggested risk mitigation measures).

The communication interface 204 of the property analysis system 102 operatively couples and communicates between the property analysis system 102, user devices 106(1)-106(n), overhead imagery server 110, and LIDAR imagery server 114, which are coupled together at least in part by the communication network(s) 104 in this particular example, although other types or numbers of communication networks or systems with other types or numbers of connections or configurations to other devices or elements can also be used. The communication network(s) 104 can include wide area network(s) (WAN(s)) and/or local area network(s) (LAN(s)), for example, and can use TCP/IP over Ethernet and industry-standard protocols, although other types or numbers of protocols or communication networks can be used. The communication network(s) 104 can employ any suitable interface mechanisms and network communication technologies including, for example, Ethernet-based Packet Data Networks (PDNs).

The property analysis system 102 in some examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory 202, communication interface 204, or other hardware or software components of one or more other devices included in the property analysis system 102. Additionally, one or more of the devices that together comprise the property analysis system 102 in other examples can be standalone devices or integrated with one or more other devices or apparatuses.

The overhead imagery server 110 can include processor(s), memory, and a communication interface, which are coupled together by a bus or other communication link (not illustrated), although other numbers or types of components could also be used. The overhead imagery server 110 can store a database or other data structure that includes overhead images captured by a drone, aircraft, satellite, high-altitude balloon, or any other source of overhead or aerial images (commonly referred to herein as "overhead images"). The overhead imagery server 110 can publish an overhead API 112 to facilitate access to the stored overhead imagery data. Accordingly, the overhead imagery server 110 can provide an API endpoint, for example, configured to intake prospective requests with particular criteria from the property analysis system 102 and return overhead imagery data.

The LIDAR imagery server 114 also can include processor(s), memory, and a communication interface, which are coupled together by a bus or other communication link (not illustrated), although other numbers or types of components could also be used. The LIDAR imagery server 114 can store a database or other data structure that includes LIDAR imagery data, including LIDAR images that indicate a relative height of captured property features, including vegetation. The LIDAR imagery server 114 can publish a LIDAR API 116 to facilitate access to the stored LIDAR imagery data. Accordingly, the LIDAR imagery server 114 can provide an API endpoint, for example, configured to intake prospective requests with particular criteria from the property analysis system 102 and return LIDAR imagery data. In some examples, the LIDAR imagery server 114 is hosted by the United States Geological Survey (USGS), although any other provider of LIDAR imagery data can also be used in other examples.

Each of the user devices 106(1)-106(n) of the network environment 100 in this example includes any type of computing device that can exchange network data, such as mobile, desktop, laptop, or tablet computing devices. Each of the user devices 106(1)-106(n) includes processor(s), memory, and a communication interface, which are coupled together by a bus or other communication link (not illustrated), although other numbers or types of components could also be used. Each of the user devices 106(1)-106(n) may run interface applications, such as web browsers or standalone applications, which may provide an interface to communicate with the property analysis system 102 via the communication network(s) 104. Each of the user devices 106(1)-106(n) may further include a display device, such as a display screen or touchscreen, or an input device, such as a keyboard or mouse, for example (not shown).

Although the exemplary network environment 100 with the property analysis system 102, user devices 106(1)-110(n), overhead imagery server 110, LIDAR imagery server 114, and communication network(s) 104 is described herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100, such as the property analysis system 102, user devices 106(1)-110(n), overhead imagery server 110, or LIDAR imagery server 114, for example, may be configured to operate as virtual instances on the same physical machine. In other words, one or more of the property analysis system 102, user devices 106(1)-110(n), overhead imagery server 110, or LIDAR imagery server 114 may operate on the same physical device rather than as separate devices communicating through the communication network(s) 104. Additionally, there may be more or fewer property analysis systems, user devices, overhead imagery servers, or LIDAR imagery servers than illustrated in FIG. 1.

The examples of this technology may also be embodied as one or more non-transitory computer-readable media having instructions stored thereon, such as in the memory 202 of the property analysis system 102, for one or more aspects of the present technology, as described and illustrated by way of the examples herein. The instructions in some examples include executable code that, when executed by one or more processors, such as the processor(s) 200 of the property analysis system 102, cause the processors to carry out steps necessary to implement the methods of the examples of this technology that will now be described herein.

Figure 3:
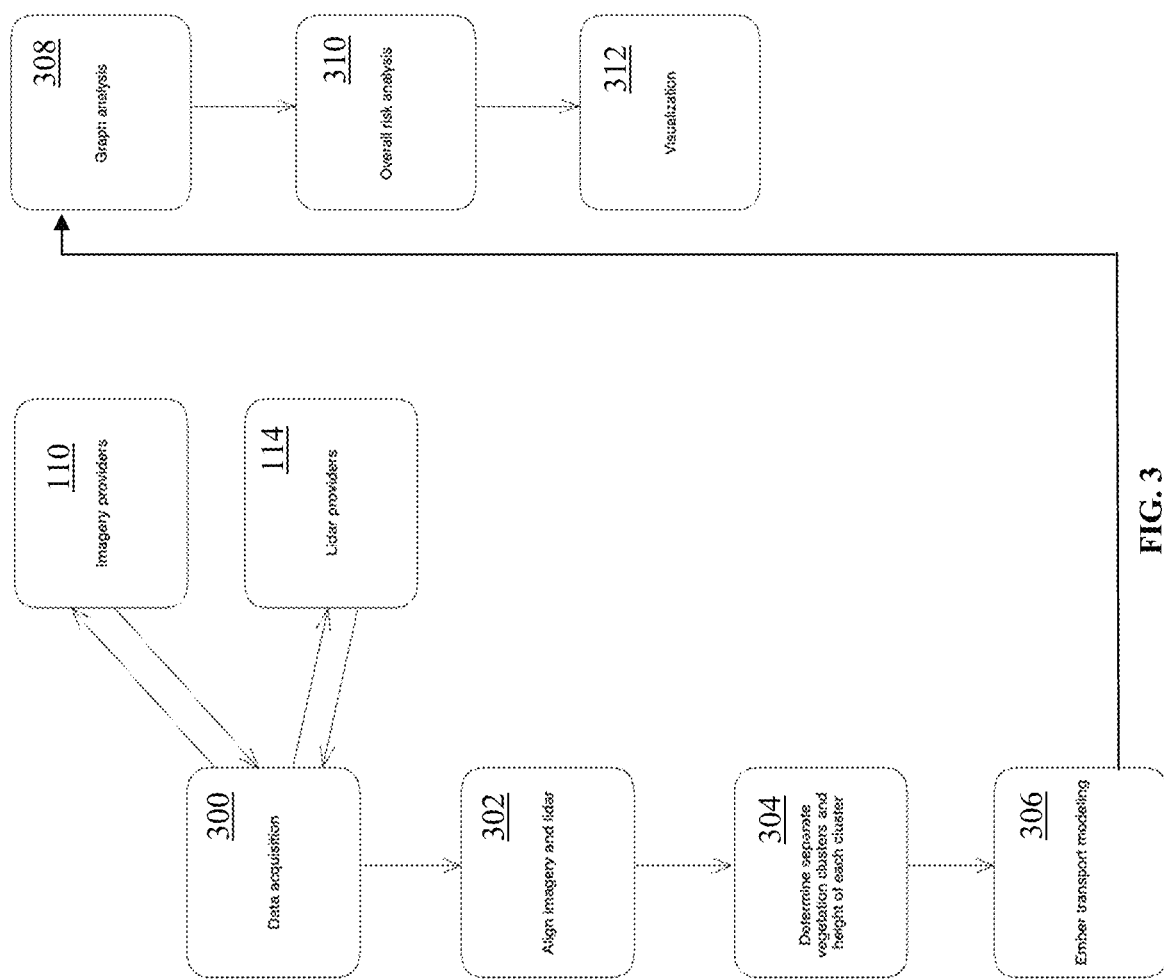
FIG. 3 is a flow diagram of an exemplary method for wildfire risk assessment.

Referring now to FIG. 3, a flow diagram of an exemplary method for wildfire risk assessment is illustrated. In step 300 in this example, the property analysis system 102 obtains at least one overhead image and at least one LIDAR image (e.g., a most recent overhead and/or LIDAR image) associated with a geographic location. In some examples, the property analysis system 102 receives a wildfire risk request from a user device 106 via a GUI provided to the user device 106 by the property analysis system 102. The wildfire risk request can include the geographic location, such as an address or geographic coordinates (e.g., latitude and longitude), for example, associated with a property of interest. Optionally, the property analysis system 102 validates the input geographic location to ensure it is in a correct format and/or within an expected range for valid properties, for example.

Accordingly, the property analysis system 102 obtains imagery data (e.g., satellite and/or aerial images) from at least one overhead imagery server 110 via at least one overhead API 112 or other data exchange protocol. The overhead imagery server can return the relevant overhead images in any digital format, such as GeoTIFF, JPEG, and/or PNG, for example. Additionally, the property analysis system 102 obtains LIDAR imagery from at least one LIDAR imagery server 114 via at least one LIDAR API 116 or other data exchange protocol. In other examples, the data acquired in step 300 can include other data (e.g., meteorological data) from other external data providers 108.

Optionally, the property analysis system 102 can prepare the overhead image and/or LIDAR image for further analysis by performing any number of preprocessing techniques, such as cropping the overhead and/or LIDAR images to a dilated and expanded representation of a property boundary, for example, to focus on the area of interest and reduce computational complexity. The cropping can be performed by the property analysis system 102 using a predefined template or by leveraging property boundary data obtained from an external data provider 108, for example. In other examples, the property analysis system 102 can perform color space transformation(s), image enhancement(s) (e.g., edge detections, sharpening, and/or noise reduction), histogram equalization, or any other computer vision preprocessing technique. For example, the property analysis system 102 can apply image enhancement technique(s) to improve the visibility of features and patterns in the overhead and/or LIDAR images.

Additionally, the property analysis system 102 can perform one or more normalizing, resizing, or resampling operations to preprocess the overhead and/or LIDAR images. For example, the property analysis system 102 can normalize the overhead image to account for differences in lighting conditions, image sensor characteristics of capture devices, and/or other factors that may affect image quality. The normalization can be performed by the property analysis system 102 by applying histogram equalization, adaptive histogram equalization, and/or other normalization technique(s) to ensure or improve consistency across the overhead image(s). Other types and/or another number of preprocessing techniques can also be applied by the property analysis system 102 to one or more of the overhead and/or LIDAR images in other examples.

Figure 4:
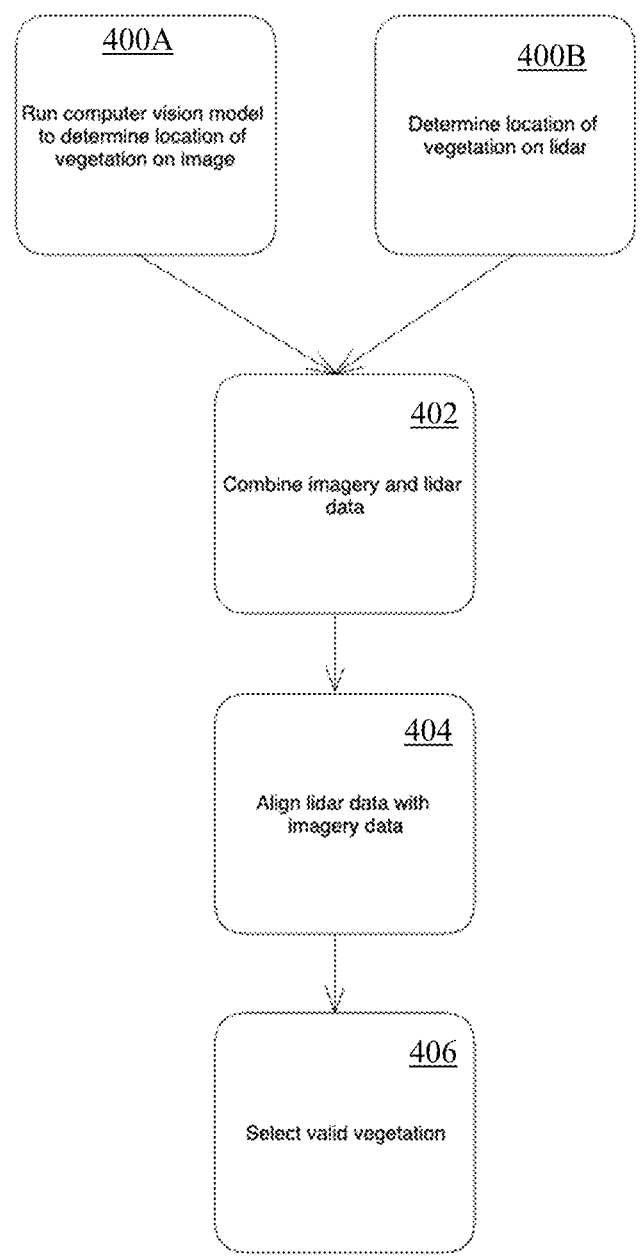
FIG. 4 is a flowchart of an exemplary method for aligning overhead and light detection and ranging (LIDAR) imagery.

In step 302, the property analysis system 102 aligns the overhead and LIDAR images based on vegetation location information extracted from the overhead and LIDAR images. Referring now to FIG. 4, a flow diagram of an exemplary method for aligning overhead and LIDAR imagery is illustrated. In step 400A in this example, the property analysis system 102 executes or applies a computer vision model to data obtained for the overhead image to determine or extract a location of the vegetation within the geographic location represented in the overhead image. In some examples, the computer vision model can be a machine learning model trained to identify vegetation based on any number of characteristics (e.g., size, shape, and/or color) and other types of models can be leveraged to extract the location of vegetation within the geographic location.

In step 400B, the property analysis system 102 optionally in parallel with step 400A, determines locations of the vegetation in the obtained LIDAR image. In one example, the property analysis system 102 analyzes a LIDAR point cloud in the data obtained for the LIDAR image to identify vegetation based on specific characteristics, such as the height and/or density of points and/or using metadata within the data for the LIDAR image obtained from the LIDAR imagery server 114. Other methods for analyzing the LIDAR image to extract the location of vegetation within the geographic location can also be used in other examples.

Figure 5:
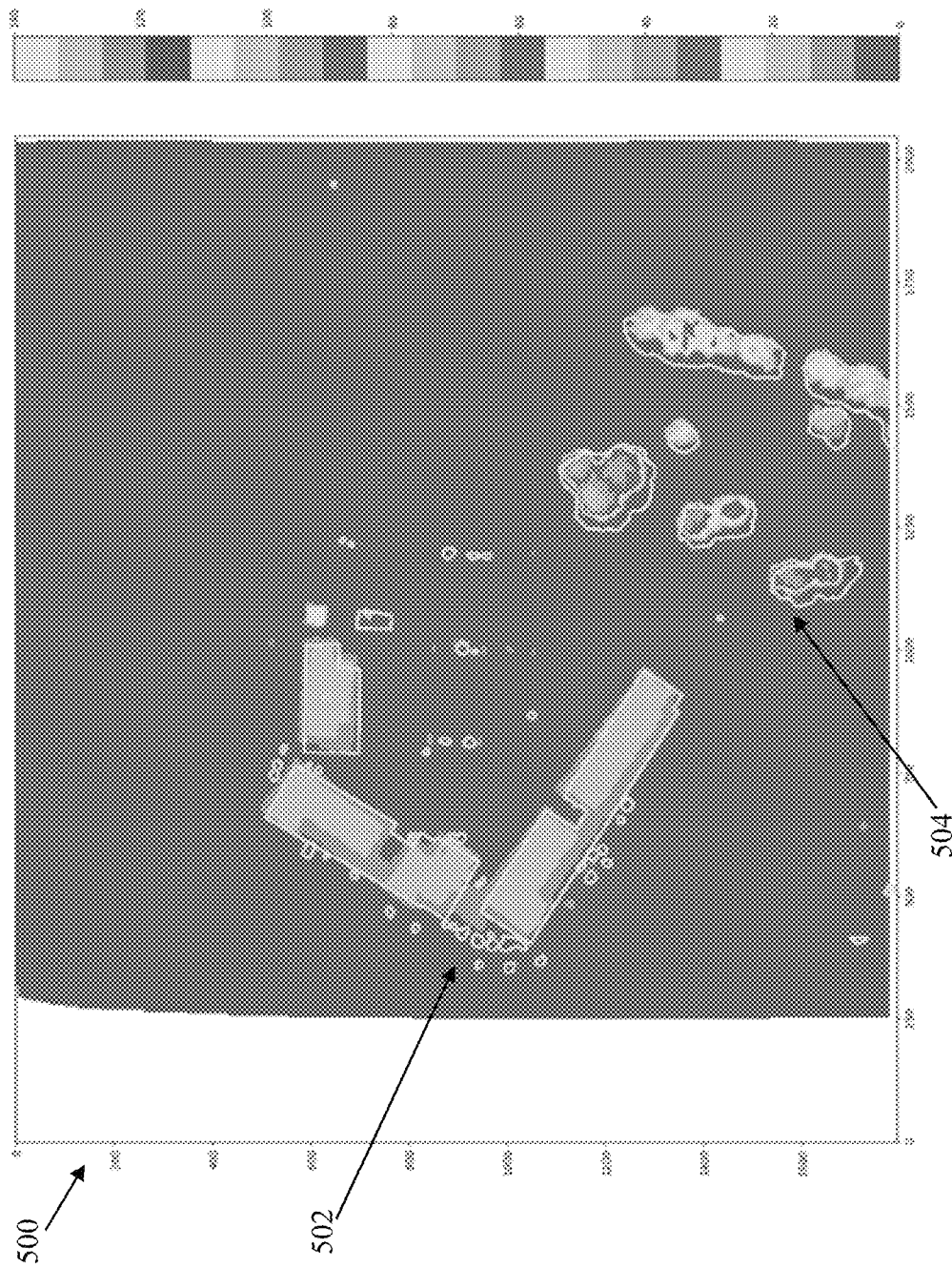
FIG. 5 is an exemplary LIDAR image with identified buildings, vegetation clusters, and associated heights.

Referring to FIG. 5, an exemplary LIDAR image 500 with identified buildings 502, vegetation clusters 504, and associated heights is illustrated. In this example, the property analysis system 102 analyzes the LIDAR image 500 to obtain vegetation (e.g., trees, bushes, etc.) and building 502 heights, which facilitates increased accuracy in the analysis of the likelihood of wildfire spread, as explained in more detail below.

Referring back to FIG. 4, in steps 402 and 404, the property analysis system 102 combines and aligns, respectively, the obtained data associated with the overhead and LIDAR. Upon extracting the vegetation location information from both the overhead image and the LIDAR image, the two associated datasets are merged in this example by identifying overlapping vegetation locations across the overhead and LIDAR images. Additionally, in step 406, the property analysis system 102 selects valid vegetation based on an overlap of the vegetation location information from the overhead and LIDAR images.

By combining and aligning overhead and LIDAR imagery data, the property analysis system 102 is able to detect vegetation represented in the LIDAR image that is not present or accurately represented in the overhead image, or vice versa. Thus, the property analysis system 102 effectively filters valid vegetation across overhead and LIDAR images that are not obtained simultaneously.

Referring back to FIG. 3, in step 304, the property analysis system 102 determines separate vegetation clusters and the height of each cluster. In some examples, the property analysis system 102 analyzes the valid vegetation selected in step 406 to identify vegetation clusters and associated boundaries based on location and/or proximity, for example. Various size parameters for the identified vegetation clusters can also be determined in some examples, such as overall and/or relative size or area consumed by the determined vegetation clusters and/or height associated with each of the vegetation clusters, which can be a maximum or average for the vegetation that collectively comprises one or more of the identified vegetation clusters.

In step 306, the property analysis system 102 applies one or more models to the aligned overhead and LIDAR images based at least in part on the vegetation height information extracted from the LIDAR image in step 304. Optionally, the model(s) can be applied to the aligned overhead and LIDAR images based on the vegetation cluster height associated with vegetation selected in step 406. In one example, the model can be an ember transport model that is applied by the property analysis system 102 to generate an indication of ember behavior proximate to the geographic location during a wildfire. The ember transport model can be applied based on one or more of wind speed or relative positions of the vegetation determined from the vegetation location information generated in steps 400A-B, for example.

In this example, the ember transport model is physics-based, grounded in scientific research, and takes into account several factors that influence the movement and distribution of embers during a wildfire, including vegetation height, wind speed, and relative vegetation position. Optionally, the ember transport model could be configured to distinguish between different types of vegetation, which might have varying levels of flammability.

In some examples, the ember transport model is based on the ember behavior and associated characteristics as disclosed in one or more of Nelson et al., "Flame Characteristics of Wind-Driven Surface Fires", 1986, Can. J. For. Res. 16, 1293-1300, Filippi et al., "Coupled Atmosphere-Wildland Fire Modelling", 2009, J. Adv. Model. Earth Syst., Vol. 1, Art. 11, Albini Frank et al., "A mathematical model for predicting the maximum potential spotting distance from a crown fire." 2012, Int'l J. of Wildland Fire 21, 609-627, Cheney et al., "Prediction of Fire Spread in Grasslands," 1998, Int'l J. of Wildland Fire 8. 10.1071/WF9980001, and/or Martin et al. "The Spotting Distribution of Wildfires," 2016, Applied Sciences 6 (6): 177, Finney et al., "Wildland Fire Behaviour: Dynamics, Principles and Processes," 2021, CSIRO Publishing, each of which is incorporated herein by reference in its entirety. Thus, the ember transport model applied in step 306 provides a robust and accurate representation of ember behavior during a wildfire.

In other examples, the model(s) applied in step 306 include a direct fire spread model, which is applied to generate a likelihood of fire spread through contact between one or more of the vegetation and the buildings of the property associated with the geographic location or between clusters of the vegetation, as identified in step 304. The direct fire spread model can be applied based on one or more of the position of vegetation relative to other vegetation and/or to one or more buildings associated with the property corresponding to the geographic location.

Figure 6B:
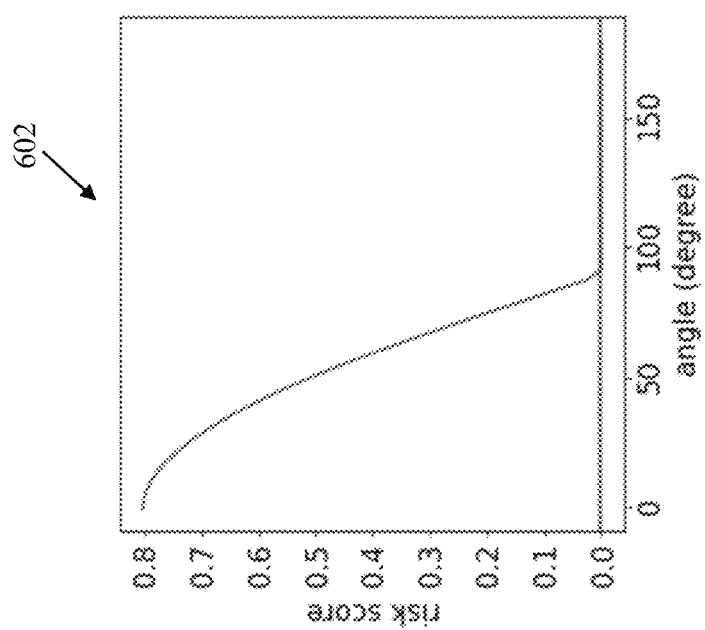
FIG. 6B is a graph illustrating a multiplication factor based on an angle between an origination point and a target point.
Figure 6A:
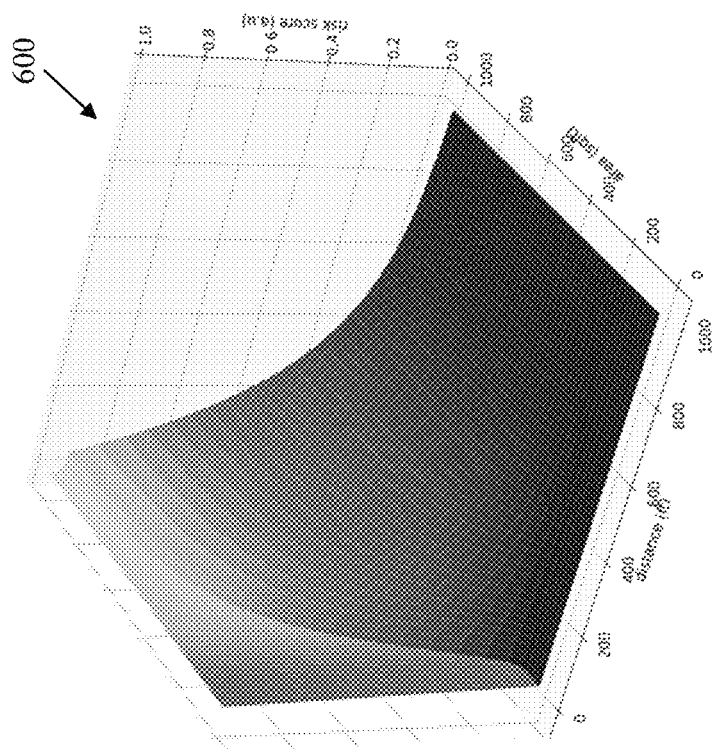
FIG. 6A is a graph illustrating the probability of wildfire spread given a distance and an area of an originating point of the wildfire.

Referring to FIG. 6A, a graph 600 illustrating the probability of wildfire spread given a distance and an area of an originating point (e.g., a particular vegetation cluster) of a wildfire is illustrated. The property analysis system 102 can generate the graph 600 from a formula resulting from the application of the model(s). The graph 600 can then be used by the property analysis system 102 to determine probabilities of wildfire spread between each pair of vegetation clusters and buildings, or a subset thereof, for example.

For example, if an origin vegetation cluster (e.g., of large trees) with an area of 200 square feet, as determined in step 304, is burning, the property analysis system 102 can use the graph 600 (and/or the formula from which the graph 600 was generated) to determine the probability that a target vegetation cluster will catch fire at a specified distance away from the origin vegetation cluster. The graph 600 assumes that the target vegetation cluster is perfectly downwind of the origin vegetation cluster, which is often not the case as established by the model(s) applied in step 306.

Referring to FIG. 6B, a graph 602 illustrating a multiplication factor based on an angle between an origination point (e.g., a particular vegetation cluster) and a target point (e.g., a building or another vegetation cluster) is illustrated. The property analysis system 102 can use the graph 602 to determine a multiplication factor based on an angle between, in the example above, the target vegetation cluster's actual position and another position assumed to be perfectly downwind of the origin vegetation cluster. More specifically, if the property analysis system 102 determines from the graph 600 that there is a 50% likelihood of wildfire spread between the origin and target vegetation clusters, then the property analysis system 102 can apply, to that percentage likelihood, a multiplication factor (e.g., between zero and one) determined from the graph 602 to reduce the percentage likelihood in accordance with the relative positions and/or angle between the origin and target vegetation clusters.

Figure 7:
FIG. 7 is a screenshot of exemplary overhead imagery with an overlay identifying vegetation clusters and fire paths.

Referring to FIG. 7, a screenshot 700 of exemplary overhead imagery with an overlay identifying vegetation clusters and fire paths is illustrated. In this example, the most probable wildfire path from a vegetation cluster 702 to the building 704 is illustrated, along with an associated score determined as explained in more detail below. Additionally, the wildfire path from the largest vegetation cluster 706 to the building 704 is also illustrated with an associated score.

The wildfire path from the largest vegetation starts at the largest vegetation cluster 706 and finds the shortest wildfire path to the selected building 704. For the most probable wildfire path, the property analysis system 102 identifies the likelihood of wildfire spread to the building 702 of each of the N vegetation clusters and determines the most probable for display based on likelihood ranking. Optionally, the determination of wildfire paths between vegetation and buildings (e.g., at least the shortest and most probable wildfire paths) is repeated for each of the buildings associated with a property corresponding to a geographic location. Also optionally, the screenshot 700 can be output as part of a GUI, as explained in more detail below.

In step 308, the property analysis system 102 generates a graph based on a result of the application of the model(s) in step 306. The graph in some examples represents a relationship between vegetation clusters, buildings, and fire pathways associated with the geographic location. In one example, the property analysis system 102 employs graph theory algorithm(s) to create and analyze relationships between nodes each representing a building or a vegetation cluster to determine the highest risk areas at the geographic location and/or potential paths for a wildfire.

Accordingly, the property analysis system 102 can construct a graph based on data representing the relationships between vegetation clusters, buildings, and potential fire pathways as determined based on the application of the model(s) in step 306. Graph theory algorithm(s) are then employed to analyze this graph to generate vulnerability information identifying the most vulnerable nodes and edges, indicating areas of the geographic location with higher wildfire spread risk.

In step 310, the property analysis system 102 generates an overall risk analysis for the geographic location. With the ember spread modeling of step 306 and graph analysis of step 308, the property analysis system 102 evaluates the potential wildfire risk for each individual building in the region of interest associated with the geographic location. For example, the vulnerability information resulting from the graph analysis in step 308 is integrated into the overall risk assessment, providing a more comprehensive understanding of potential wildfire spread and its impact on the individual property corresponding to the geographic location. Thus, the overall risk analysis considers factors such as the proximity of vegetation and the likelihood of ember ignition, among other factors.

Optionally, each building is scored by the property analysis system 102 based on its associated wildfire risk. The building scores can correspond with a likelihood of wildfire spread between features of the geographic location, including vegetation clusters, as determined from the application of the model(s) in step 306 and the graph analysis in step

308. Also optionally, the property analysis system 102 can determine one or more mitigation actions to reduce a wildfire risk for the geographic location. For example, the property analysis system 102 can use the graph analysis to identify a most vulnerable vegetation cluster that, if removed from the property, would significantly reduce the risk of wildfire spread. Thus, the property analysis system 102 can advantageously account for small-scale changes, such as the growth or removal of a single tree, which can impact the risk of fire for a specific building.

In step 312, the property analysis system 102 outputs a wildfire risk score for at least one of the buildings via a GUI provided to the user device 106 in response to the wildfire risk request received in step 300. The wildfire risk score is generated based at least in part on the generated graph and associated analysis in step 308. Optionally, the building scores can be aggregated to generate an overall risk score for the property associated with the geographic location, and other methods for scoring the wildfire risk can also be used in other examples.

In some examples, the wildfire risk score is output via a visualization or graphical representation of the geographic location that includes an indication of one or more potential hazards associated with the geographic location or a relative wildfire risk associated with one or more regions of the geographic location, for example. Optionally, the output GUI can include an indication of one or more mitigation actions. Thus, the wildfire risk assessment for the specified property is displayed in a visually comprehensible, intuitive format that includes one or more of a risk score, a map with identified high-risk areas, and additional contextual information such as recommendation mitigation actions, for example. The GUI, therefore, allows users to easily understand and interpret the potential wildfire risk for each building associated with the provided geographic location.

Accordingly, as described and illustrated by way of the examples herein, this technology advantageously leverages advanced models to determine risk probability, ignition probability, ember transport, and spotting mass probability, for example, considering various factors such as wind speed, distance between objects, vegetation and building heights, and ember decay rate, for example, to provide a more comprehensive assessment of wildfire spread potential and risk. The disclosed technology provides a granular, building-by-building analysis of wildfire risk and is sensitive and responsive to relatively small-scale property changes. Additionally, the disclosed technology improves predictive accuracy by incorporating a variety of factors and data sources to offer more accurate predictions of fire behavior and risk.

Access to detailed, building-specific wildfire risk assessments provided by the disclosed technology can empower homeowners and communities to take proactive steps to reduce their vulnerability to wildfires and improve overall preparedness, potentially preventing catastrophic losses. Thus, the technology described and illustrated herein can be used by homeowners and insurers to assess their risks of wildfires and, by understanding the most likely path of a wildfire and identifying high-risk areas, these entities can advantageously make more informed decisions about how to mitigate wildfire risks.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure that are within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

Aspects of the present technical solutions are described herein with reference to flowchart illustrations and/or block diagrams of methods, apparatuses (systems), and computer program products according to embodiments of the technical solutions. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As used herein, the terms "worker," "algorithm," "system," "module," "engine," or "architecture," if used herein, are not intended to be limiting of any particular implementation for accomplishing and/or performing the actions, steps, processes, etc., attributable to and/or performed thereby. An algorithm, system, module, engine, and/or architecture may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular algorithm, system, module, and/or engine is, unless otherwise specified, for purposes of convenience of reference and not intended to be limiting to a specific implementation. Additionally, any functionality attributed to an algorithm, system, module, engine, and/or architecture may be equally performed by multiple algorithms, systems, modules, engines, and/or architectures incorporated into and/or combined with the functionality of another algorithm, system, module, engine, and/or architecture of the same or different type, or distributed across one or more algorithms, systems, modules, engines, and/or architectures of various configurations.

The flowchart and block diagrams in the figures illustrate the architecture, functionality, and operation of possible implementations of systems, methods, and computer program products according to various embodiments of the present technical solutions. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action can be said to be "in response to" a first action independent of whether the second action results directly or indirectly from the first action. The second action can occur at a substantially later time than the first action and still be in response to the first action. Similarly, the second action can be said to be in response to the first action even if intervening actions take place between the first action and the second action, and even if one or more of the intervening actions directly cause the second action to be performed. For example, a second action can be in response to a first action if the first action sets a flag and a third action later initiates the second action whenever the flag is set.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, which can, of course, vary. It is also to be understood that the terminology used herein is for the purpose of describing particular embodiments only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 components refers to groups having 1, 2, or 3 components. Similarly, a group having 1-5 components refers to groups having 1, 2, 3, 4, or 5 components, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method implemented by a property analysis system and comprising:
responsive to a wildfire risk request comprising a geographic location received from a user device, extracting vegetation location information from at least one overhead image and at least one light detection and ranging (LIDAR) image associated with the geographic location;
aligning the overhead and LIDAR images based on the extracted vegetation location information;
applying one or more models to the aligned overhead and LIDAR images based at least in part on vegetation height information extracted from the LIDAR image;
generating a graph based on a result of the application of the models, wherein the graph represents a relationship between vegetation, one or more buildings, and one or more fire pathways associated with the geographic location; and
outputting a wildfire risk score for at least one of the buildings via a graphical user interface (GUI) provided to the user device in response to the wildfire risk request, wherein the wildfire risk score is generated based on the generated graph.

2. The method of claim 1, wherein the models comprise an ember transport model and the method further comprises applying the ember transport model based on one or more of wind speed or relative positions of the vegetation determined from the vegetation location information to generate an indication of ember behavior during a wildfire.

3. The method of claim 1, wherein the models comprise a direct fire spread model and the method further comprises applying the direct fire spread model to generate a likelihood of fire spread through contact between one or more of the vegetation and the buildings or between clusters of the vegetation.

4. The method of claim 3, further comprising applying the direct fire spread model further based on one or more of the relative positions of the vegetation or other relative positions of the vegetation and the buildings.

5. The method of claim 1, further comprising:
determining one or more mitigation actions to reduce a wildfire risk for the geographic location;
generating a graphical representation of the geographic location comprising an indication of one or more potential hazards associated with the geographic location or a relative wildfire risk associated with one or more regions of the geographic location; and
outputting the GUI to include the graphical representation and the mitigation actions.

6. The method of claim 1, further comprising:
applying a computer vision model to imagery data obtained for the overhead image to determine a location of the vegetation within the geographic location, wherein the imagery data for the overhead image is obtained via one or more networks from an overhead image server;
determining another location of the vegetation from LIDAR data for the LIDAR image obtained via the networks from a LIDAR server; and
combining the imagery data and the LIDAR data to facilitate the alignment.

7. The method of claim 6, further comprising:
selecting from the vegetation based on an overlap of the vegetation location information from the overhead image and the LIDAR image; and
applying the models to the aligned overhead and LIDAR images based at least in part on the vegetation height information extracted from the LIDAR image for the selected vegetation.

8. A property analysis system, comprising memory having instructions stored thereon and one or more processors coupled to the memory and configured to execute the stored instructions to:
responsive to a wildfire risk request comprising a geographic location received from a user device, extract vegetation location information from at least one overhead image and at least one light detection and ranging (LIDAR) image associated with the geographic location;
align the overhead and LIDAR images based on the extracted vegetation location information;
apply one or more of an ember transport model or a direct fire spread model to the aligned overhead and LIDAR images based at least in part on vegetation height information extracted from the LIDAR image;
generate a graph based on a result of the application of the ember transport model or the direct fire spread model, wherein the graph represents a relationship between vegetation, one or more buildings, and one or more fire pathways associated with the geographic location; and
output a wildfire risk score for at least one of the buildings via a graphical user interface (GUI) provided to the user device in response to the wildfire risk request, wherein the wildfire risk score is generated based on the generated graph.

9. The property analysis system of claim 8, wherein the processors are further configured to execute the stored instructions to apply the ember transport model further based on one or more of wind speed or relative positions of the vegetation determined from the vegetation location information to generate an indication of ember behavior during a wildfire.

10. The property analysis system of claim 8, wherein the processors are further configured to execute the stored instructions to apply the direct fire spread model further based on one or more relative positions of the vegetation or other relative positions of the vegetation and the buildings to generate a likelihood of fire spread through contact between one or more of the vegetation and the buildings or between clusters of the vegetation.

11. The property analysis system of claim 8, wherein the processors are further configured to execute the stored instructions to:
determine one or more mitigation actions to reduce a wildfire risk for the geographic location;
generate a graphical representation of the geographic location comprising an indication of one or more potential hazards associated with the geographic location or a relative wildfire risk associated with one or more regions of the geographic location; and
output the GUI to include the graphical representation and the mitigation actions.

12. The property analysis system of claim 8, wherein the processors are further configured to execute the stored instructions to:
 apply a computer vision model to imagery data obtained for the overhead image to determine a location of the vegetation within the geographic location, wherein the imagery data for the overhead image is obtained via one or more networks from an overhead image server;
 determine another location of the vegetation from LIDAR data for the LIDAR image obtained via the networks from a LIDAR server; and
 combine the imagery data and the LIDAR data to facilitate the alignment.

13. The property analysis system of claim 8, wherein the processors are further configured to execute the stored instructions to:
 select from the vegetation based on an overlap of the vegetation location information from the overhead image and the LIDAR image; and
 apply the models to the aligned overhead and LIDAR images based at least in part on the vegetation height information extracted from the LIDAR image for the selected vegetation.

14. A non-transitory computer-readable medium having stored thereon instructions comprising executable code that, when executed by one or more processors, causes the processors to:
 responsive to a wildfire risk request comprising a geographic location received from a user device, extract vegetation location information from at least one overhead image and at least one light detection and ranging (LIDAR) image for vegetation associated with the geographic location;
 select from the vegetation based on an alignment of the overhead and LIDAR images according to the extracted vegetation location information;
 apply one or more models to the aligned overhead and LIDAR images based at least in part on vegetation height information extracted from the LIDAR image for the selected vegetation;
 generate a graph based on a result of the application of the models, wherein the graph represents a relationship between the selected vegetation, one or more buildings associated with the geographic location, and one or more fire pathways associated with the geographic location; and
 output a wildfire risk score for at least one of the buildings via a graphical user interface (GUI) provided to the user device in response to the wildfire risk request, wherein the wildfire risk score is generated based on the generated graph.

15. The non-transitory computer-readable medium of claim 14, wherein the models comprise an ember transport model and the executable code, when executed by the processors, further causes the processors to apply the ember transport model to generate an indication of ember behavior during a wildfire.

16. The non-transitory computer-readable medium of claim 15, wherein the executable code, when executed by the processors, further causes the processors to apply the ember transport model based on one or more of wind speed or relative positions of the selected vegetation determined from the vegetation location information.

17. The non-transitory computer-readable medium of claim 14, wherein the models comprise a direct fire spread model and the executable code, when executed by the processors, further causes the processors to apply the direct fire spread model to generate a likelihood of fire spread through contact between one or more of the selected vegetation and the buildings or between clusters of the selected vegetation.

18. The non-transitory computer-readable medium of claim 17, wherein the executable code, when executed by the processors, further causes the processors to apply the direct fire spread model based on one or more of the relative positions of the selected vegetation or other relative positions of the selected vegetation and the buildings.

19. The non-transitory computer-readable medium of claim 14, wherein the executable code, when executed by the processors, further causes the processors to:
 determine one or more mitigation actions to reduce a wildfire risk for the geographic location;
 generate a graphical representation of the geographic location comprising an indication of one or more potential hazards associated with the geographic location or a relative wildfire risk associated with one or more regions of the geographic location; and
 output the GUI to include the graphical representation and the mitigation actions.

20. The non-transitory computer readable medium of claim 14, wherein the executable code, when executed by the processors, further causes the processors to
 apply a computer vision model to imagery data obtained for the overhead image to determine a location of the vegetation within the geographic location, wherein the imagery data for the overhead image is obtained via one or more networks from an overhead image server;
 determine another location of the vegetation from LIDAR data for the LIDAR image obtained via the networks from a LIDAR server;
 combine the imagery data and the LIDAR data to facilitate the alignment; and
 apply the models to the aligned overhead and LIDAR images based at least in part on the vegetation height information extracted from the LIDAR image for the selected vegetation.

* * * * *